United States Patent [19]
Hallez

[11] Patent Number: 4,718,398
[45] Date of Patent: Jan. 12, 1988

[54] CIRCULAR SAW FOR STONY MATERIALS

[75] Inventor: Charles P. Hallez, Tellin, Belgium

[73] Assignee: Diamant Boart Societe Anonyme, Brussels, Belgium

[21] Appl. No.: 903,795

[22] Filed: Sep. 4, 1986

[30] Foreign Application Priority Data

Sep. 4, 1985 [BE] Belgium .............................. 0/215541

[51] Int. Cl.$^4$ .............................................. B28D 1/04
[52] U.S. Cl. .................... 125/15; 51/206 R; 51/207
[58] Field of Search ................. 125/15, 18; 51/206 R, 51/206.4, 207, 209 R

[56] References Cited

U.S. PATENT DOCUMENTS

| 1,977,952 | 10/1934 | Offenbacher | 51/206 R |
| 1,986,849 | 1/1935 | Pohl | 51/206 R |
| 3,023,551 | 3/1962 | Osenberg | 125/15 |
| 3,641,718 | 2/1972 | Ferchland | 51/209 R |
| 3,716,950 | 2/1973 | McClure | 125/15 |
| 4,034,639 | 7/1977 | Caldwell . | |
| 4,350,497 | 9/1982 | Ogman | 51/209 R |

FOREIGN PATENT DOCUMENTS

| 1957226 | 1/1972 | Fed. Rep. of Germany . | |
| 2365019 | 7/1974 | Fed. Rep. of Germany . | |
| 2740891 | 3/1979 | Fed. Rep. of Germany | 125/15 |
| 3218562 | 1/1983 | Fed. Rep. of Germany . | |
| 3236045 | 3/1984 | Fed. Rep. of Germany | 125/15 |
| 2356491 | 12/1976 | France . | |

Primary Examiner—Harold D. Whitehead
Attorney, Agent, or Firm—Sughrue, Mion, Zinn, Macpeak, and Seas

[57] ABSTRACT

A higher performance, lighter and thinner composite sawing disc for stony materials is made by assembling, preferably by bonding, a peripheral rim (2) provided with diamond segments (6) on a self-supporting, metallic honeycomb structure (3) strengthened at its center by a central ring (4). Excellent strength of the assembly is obtained by bonding annular discs (5) of thin plate to the lateral faces.

13 Claims, 3 Drawing Figures

CIRCULAR SAW FOR STONY MATERIALS

BACKGROUND OF THE INVENTION

This invention relates to a circular saw for stony materials comprising a peripheral rim provided around its circumference with cutting elements, a composite core of which the lateral faces are covered by two annular discs equal in diameter of thin plate assembled by bonding under pressure and of which the centre is provided with a central ring for mounting on a drive shaft.

The main application of the invention is in the manufacture of lightweight, low-noise sawing discs which, despite their thinness, show excellent resistance to deflection during the sawing operation.

DE-AS No. 1 042 874 relates to a low-noise circular saw for stony materials. The core comprises two thin annular metal discs equal in diameter which are disposed coaxially on either side of a sheet of vibration-absorbing material. These discs are joined firmly to one another by bonding under pressure. The interposition of the absorbing sheet reduces or even eliminates the noise generated by the interaction of the cutting elements and the stony material during application of the cutting force.

Unfortunately, this saw has the disadvantage of inadequate static and dynamic strength because it undergoes unacceptable cutting deflections during the sawing of hard stony materials.

Similarly, Belgian Patent application No. 0/168.557 relates to a circular saw capable of absorbing lateral stresses and of making a straight cut.

This saw consists of two symmetrical discs of thin steel plate stamped into the shape of saucers. In the first embodiment, the discs are joined back-to-back so as to form a biconcave circular saw of which the splayed edges are held apart by a spacer ring. In a second embodiment, the discs are joined face-to-face to form a bevelled tool of which the central part is hollow. The empty space between the discs is filled with a vibration-absorbing material.

Although this embodiment makes the saw stronger, it does not make it any lighter. In addition, the circular saw thus obtained has a core of which the thickness is substantially equal to that of conventional discs. Accordingly, it does not enable the losses of material during sawing to be reduced.

SUMMARY OF THE INVENTION

The present invention relates to a circular saw which obviates the above-mentioned disadvantage. The object of the invention is to provide a sawing disc capable of cutting straight through hard stones without generating any noise and without undergoing any deflection during sawing.

Accordingly, the present invention relates to a circular saw for stony materials comprising a peripheral rim which is provided around its circumference with cutting elements and which surrounds a composite core of which the lateral faces are covered by two annular discs equal in diameter of thin plate assembled by bonding under pressure and of which the centre is provided with a central ring for mounting on a drive shaft. The core of the saw consists of a thin skeleton having a cellular structure of open or closed cells to which the above-mentioned annular discs are applied.

In a first particular embodiment, the core is a cellular matrix of lightweight metal preferably having a honeycomb structure.

In a second embodiment, the core of the saw is a rigid foam of a synthetic cellular material with open or closed cells.

The core is advantageously coated and/or filled with an elastic noise-absorbing material.

According to one aspect of the invention, the annular discs are thin sheets of mild steel approximately 0.10 to 0.60 mm and more especially 0.15 mm thick for a diameter of 600 mm.

BRIEF DESCRIPTION OF THE DRAWINGS

Other features and details of the invention will become apparent from the following detailed description in conjunction with the accompanying drawings which diagrammatically illustrate purely by way of example two embodiments of the invention. In these drawings.

In these various Figures, the same reference numerals denote the same or analogous elements.

DETAILED DESCRIPTIONS OF PREFERRED EMBODIMENTS

Figure 1:
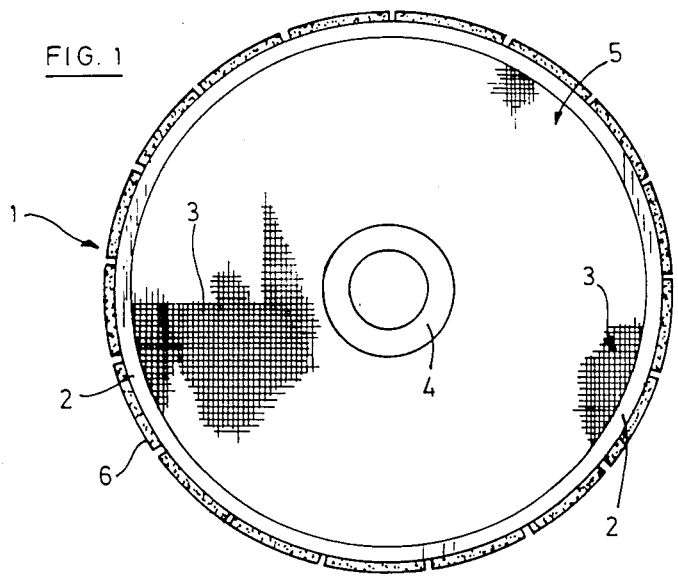
FIG. 1 is a side elevation partly broken away of a saw according to the invention.
Figure 2:
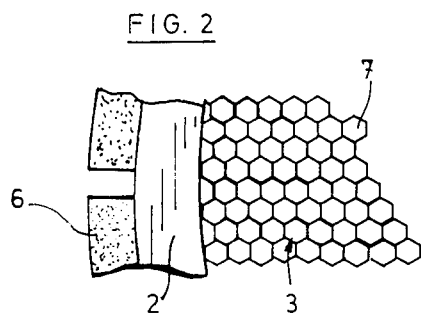
FIG. 2 is a detailed section of FIG. 1.
Figure 3:
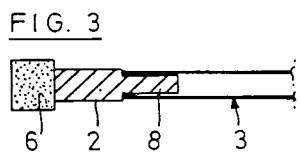
FIG. 3 is a partial radial section through the saw illustrated in FIGS. 1 and 2.

As shown in FIG. 1, a circular saw according to the invention globally denoted by the reference 1 comprises a peripheral rim 2, a composite core 3 and a central ring 4 fixed together by two annular discs 5.

The peripheral rim 2 surrounds the composite core and is provided around its circumference with cutting elements consisting, for example, of diamond segments slightly overlapping the core on both sides. The diamond segments are brazed or optionally laser-welded to the rim 2.

In a first embodiment of the sawing disc according to the invention, the core 3 consists of a metallic sheet comprising a plurality of hexagonal cells 7 formed by thin intersecting lamellae arranged honeycomb-fashion. This cellular grille is disposed in the annular part of the peripheral rim 2. It forms a metallic reinforcement at the centre of which the assembly ring 4 is mounted. The peripheral rim 2, the core 3 and the central ring 4 are tightly held between two thin annular discs equal in diameter to form a rigid assembly.

The self-supporting honeycomb structure is advantageously filled with an absorbing material to absorb the noise and to reduce the sound level of the tool in operation.

It is also possible to use rigid foams of synthetic material having a closed-cell porous structure, such as the ROHACELL ® materials manufactured by ROHM GmbH (Darmstadt, Federal Republic of Germany). The synthetic materials used may be polymethacrylimide, polystyrene, polyvinylchloride, polyurethane and phenol-formaldehyde resin.

Two examples of embodiment of a circular saw according to the ivention are described in the following.

EXAMPLE 1

A peripheral rim 2 of tempered steel plate having a Rockwell hardness of from 41 to 44 $R_c$ and a thickness of approximately 3.4 mm is cut by laser to have an external diameter of 600 mm and an internal diameter of 428 mm.

The rim 2 is provided around its circumference with diamond segments 4.5 mm wide mounted on the rim to overlap it on either side. On the inside, the rim has shoulders 8 which are symmetrical in relation to the median plane.

The depth of the shoulder 8 is 0.20 mm and corresponds to the thickness of the steel discs increased by that of the layer of adhesive. The width of the shoulder 8 is 20 mm.

The rim is placed on a template (not shown) covered beforehand with a thin steel disc 5 0.15 mm thick. The disc is coated over its upper surface with ESP 109 adhesive made by CCMP (Antwerp). It has a diameter slightly smaller than the external diameter of each of the shoulders of the rim 2.

A central ring 4 having an external diameter of 120 mm and a thickness of approximately 38 mm and provided with a bore is also placed on the above-mentioned template.

The peripheral rim and the central ring 4 define an annular space coated with adhesive on the template.

A cellular honeycomb structure is placed thereon. This structure is in the form of a sheet 3 of lightweight metal, such a aluminium. The structure in question is prepared from a honeycomb panel which is cut to the required dimensions.

Examples of suitable cellular structures are the materials "HEXCEL" or "CYANAMID" which are widely used, particularly in the aeronautical field. They are made from various metallic or non-metallic materials, for example aluminium, stainless steel, synthetic resins of the KEVLAR or NOMEX type.

According to one aspect of the invention, the cells 7 of the honeycomb core 3 are filled with a powder of ethylene/vinyl acetate copolymers.

The template comprising the powder-filled core is then covered by a second steel disc 5 of the same thickness as the first. This disc is coated with ESP 109 adhesive which is capable of withstanding a temperature of around 250° to 350° C.

The whole is held in place under pressure and placed in an autoclave.

The increase in temperature results in fusion and copolymerization of the copolymer powder which thus forms a thermosetting resin filling each of the cells of the structure. This resin, which has excellent sound-deadening properties, prevent the cells from acting as a resonance cavity.

This resin also assists in enhancing the strength of the self-supporting structure by making it more rigid and providing for better anchorage of the steel sheets. Good results have been obtained with LEVASINT® for example, a powder made by BAYER AG.

The dynamic strength of the saw thus obtained is greater than that of a conventional solid circular saw.

This is because the composite disc is given a dynamic strength equal to that of conventional discs despite the use of a thinner core consisting of a honeycomb structure only 2.8 to 3.0 mm thick covered by two mild steel sheets approximately 0.15 mm thick.

The honeycomb structures have the advantage of being far lighter in weight than their solid equivalents with similar mechanical properties.

The weight gain of the present composite disc over the conventional disc is very appreciable, the reduction in weight being approximately half. For a diameter of 600 mm, the weight of a conventional disc amounts to 6.7 kg, the weight of the composite disc according to the invention reaching no more than 3.0 kg.

This reduction in weight makes the large-diameter discs easier to handle.

EXAMPLE 2

A composite disc having an external diameter of 900 mm is made by mounting a peripheral rim 888 mm in external diameter for an internal diameter of 708 mm and a thickness of 3.6 mm on a self-supporting honeycomb structure of metal 3.0 mm thick.

The 0.3 mm deep shoulders formed in the sides of the peripheral rim and the honeycomb core are covered by two annular discs of thin mild-steel plate 0.5 mm thick. The total thickness of the composite disc is thus 3.6 mm whereas a conventional disc of the same diameter has a total thickness of greater than 4.75 mm.

The peripheral rim of the 900 mm composite disc may be provided with segments no greater than 5.0 mm thick whereas, in a standard disc, the minimal thickness of the segments is at least 6.5 mm.

This significant reduction in the thickness of the segments provides for an approximately 25% saving in the quantity of diamond concretion to be used. It also enables the losses of materials and the consumption of energy during sawing to be reduced to the same extent.

The difference in weight between a composite disc according to the invention and a conventional disc is even greater. Whereas a conventional 900 mm disc weighs 23 kg, this figure is reduced to 7 kg using a composite core.

To this end, the honeycomb structure is filled with a silicone-absed elastomeric product, advantageously GOLDEN HERMETITE®, which is spread homogeneously with a spatula before the product has time to adhere. An elastic resin which withstands temperatures of from $-40$® to $+250°$ C. is formed by drying. These two annular mild-steel discs approximately 0.15 mm thick are joined to the lateral faces of the honeycomb structure with the ESP 109 adhesive described in Example 1.

Comparative sawing tests on balmoral having a Shore hardness of greater than 105 were carried out on a test bench using 900 mm diameter saws. Balmoral is a granite having a high quartz content. The noise level as measured around the test bench devoid of any sound insulation using a BRUEL and KJAER static noise-level analyzer at a distance of 1 m decreases by approximately 5 $dB_{(A)}$, falling from 97 $dB_{(A)}$ for a conventional saw to 92 $dB_{(A)}$ for a saw according to the invention. The peripheral speed of the saw is 38 m/s.

It is obvious that the invention is not limited to the embodiments of the process described above and that numerous modifications may be made to those embodiments without taking them beyond the scope of the following claims.

Thus, the absorbent material intended to reduce the noise of the saw may consist of a silicone foam instead of the copolymer described above.

The bonding of the lateral sheets may optionally be strengthened at the level of the peripheral rim and the central ring by laser welding.

What is claimed is:

1. A circular saw (1) for stony materials comprising a peripheral rim (2) provided around its circumference with cutting elements (6) and surrounding a composite core (3) of which the lateral faces are covered by two annular discs (5) equal in diameter of thin plate assembled by bonding under pressure and of which the centre is provided with a central ring (4) for mounting on a drive shaft, characterized in that the core (3) consists of a thin skeleton having a cellular structure of open or closed cells to which the said annular discs are applied.

2. A circular saw as claimed in claim 1, characterized in that the core (3) is a cellular matrix preferably having a honeycomb structure.

3. A circular saw as claimed in claim 1, characterized in that the cellular matrix is made of lightweight metal.

4. A circular saw as claimed in claim 1, characterized in that the core (3) consists of a rigid foam of a synthetic material having a cellular structure of closed cells.

5. A circular saw as claimed in claim 1 or 4, characterized in that the core (3) is coated with an elastic noise-absorbing material.

6. A circular saw as claimed in claim 1 or 2, characterized in that the core (3) is filled with an elastic noise-absorbing material.

7. A circular saw as claimed in claim 1, characterized in that the core (3) has a thickness of from 2.8 to 5.0 mm and preferably of 3.0 mm for a diameter of the sawing disc of 600 mm and 3.6 mm for a diameter of 900 mm or greater.

8. A circular saw as claimed in claim 5, characterized in that the absorbing material is a polyurethane foam.

9. A circular saw as claimed in claim 5, characterized in that the absorbing material is a silicone foam.

10. A circular saw as claimed in claim 1, characterized in that the annular discs (5) are thin sheets of mild steel having a thickness of approximately 0.10 to 0.60 mm and more especially of 0.15 mm for a diameter of 600 mm.

11. A circular saw as claimed in claim 6, characterized in that the absorbing material is a polyurethane foam.

12. A circular saw as claimed in claim 6, characterized in that the absorbing material is a silicone foam.

13. A circular saw as claimed in claim 6 wherein said noise-absorbing material is free of abrasives.

* * * * *